June 24, 1969 J. L. JOHNSON 3,451,411
PRESSURE RESPONSIVE APPARATUS
Filed June 28, 1966

INVENTOR.
JEROME L. JOHNSON
BY *Charles J. Ungemach*
ATTORNEY

United States Patent Office 3,451,411
Patented June 24, 1969

3,451,411
PRESSURE RESPONSIVE APPARATUS
Jerome L. Johnson, St. Paul, Minn., assignor to Honeywell Inc., Minneapolis, Minn., a corporation of Delaware
Filed June 28, 1966, Ser. No. 561,185
Int. Cl. F15c *1/08;* F15d *1/14*
U.S. Cl. 137—81.5                                       7 Claims

ABSTRACT OF THE DISCLOSURE

A fluidic pressure ratio sensor whose output is a train of pressure pulses having a frequency that varies with the ratio of two fluid pressures, but is independent of absolute pressure.

---

This invention relates to a pressure responsive apparatus and more specifically to a fluid oscillator for obtaining indications of the ratio between two pressures.

There are various types of prior art oscillators known the the fluid art; for example, fluid oscillators such as shown in Warren 3,158,166, FIGURE 6, which have a nozzle for directing a fluid stream at a splitter and a chamber and an outlet located on each side of the splitter produce outputs that vary with the ratio between the output and the input pressure. It has also been found that these oscillators do not make very good pressure ratio sensing devices because they are not accurate over a range of pressures. For example, an oscillator which would accurately measure the ratio of 5 p.s.i. to 10 p.s.i. would become inaccurate if the pressure changed to 20 p.s.i. to 40 p.s.i. respectively. In other words, the accuracy of the prior art fluid oscillators would depend upon the absolute pressures involved. Consequently, such apparatus could not be used where the absolute pressures were likely to vary over a considerable range.

The present invention provides fluid oscillator apparatus which will accurately respond to pressure ratios even though the absolute pressures change considerably. Briefly, this is accomplished by altering the configuration of the prior art oscillators to provide an expanded area adjacent to the inlet orifice of the oscillator to allow fluid to expand in all directions perpendicular to the initial direction of flow. This novel expedient has been found to overcome the undesirable dependence upon absolute pressure and allows the oscillator to operate as a pressure ratio indicator over a wide range of pressures.

The functioning of my invention will become apparent from the following description along with the drawings, in which.

Figure 1:
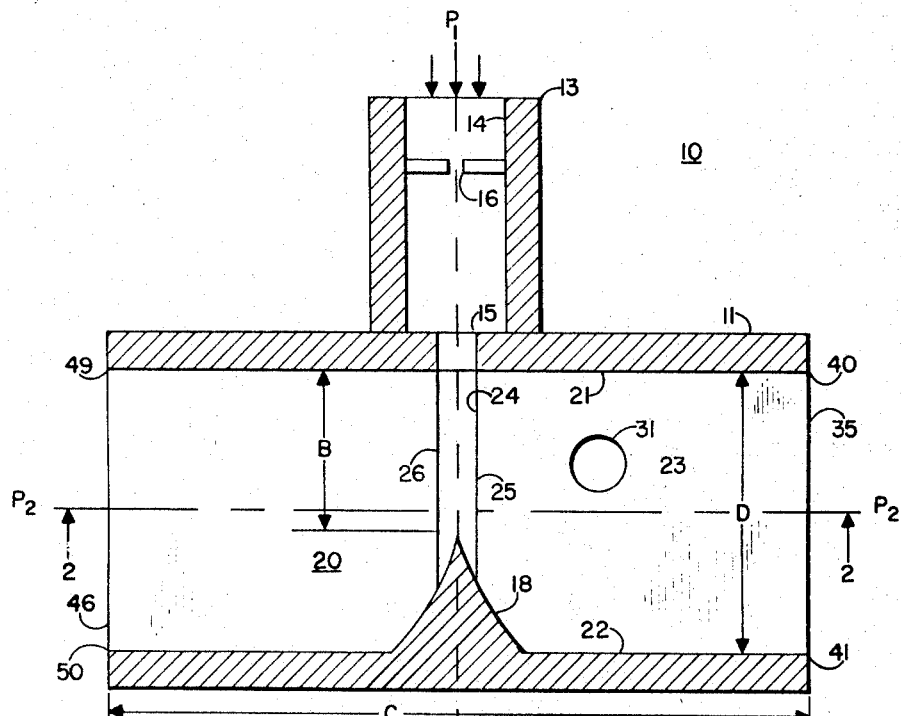
FIGURE 1 is a cross-sectional view of my pressure ratio sensor taken along line 1—1 of FIGURE 2.
Figure 2:
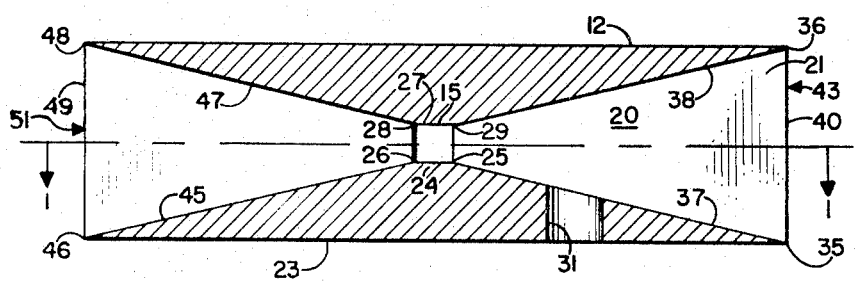
FIGURE 2 is a cross-sectional view of the pressure ratio sensor taken along line 2—2 of FIGURE 1.

Referring now to FIGURE 1 and FIGURE 2, reference numeral 10 generally designates my pure fluid pressure ratio sensor and reference numeral 11 generally designates a housing for pressure ratio sensor 10. An inlet housing 13 is shown connected to housing 11 and located within housing 13 is a fluid passage 14 connected to a fluid inlet nozzle 15 through an orifice 16. An axis of symmetry 17 passes through orifice 16 and inlet nozzle 15. Located substantially in line with the axis 17 is a splitter element 18.

A chamber 20 is shown within housing 11 which is formed by a first side 21, a second side 22, a bottom member 23, and a top member 12. Bottom member 23 has a plane surface 24 thereon and plane surface 24 has a first edge 25 and a second edge 26 thereon. Top member 12 likewise has a plane surface 27 thereon having a first edge 28 and a second edge 29. A signal pickoff 31 is located in bottom member 23. It will be noted that chamber 20 is substantially bilaterally symmetrical with respect to axis 17 although this is not necessary for proper operation.

Chamber 20 diverges in a smooth manner outward from edges 25 and 29 to edges 35 and 36 respectively. A first smooth surface 37 connects edge 25 to edge 35, similarly, a second smooth surface 38 connects edge 29 to edge 36. First side 21 has an edge 40, and second side 22 has an edge 41. Edges 36, 35, 40, and 41 define the outer boundaries of a fluid outlet 43. The other side of chamber 21 is substantially similar having a first smooth surface 45 connecting edge 26 to edge 46, a second smooth surface 47 similarly connects edge 28 to edge 48. First side 21 has an outer edge 49 thereon and second side 22 correspondingly has an outer edge 50. Edges 46, 48, 49, and 50 define the outer boundaries of outlet 51.

It will be seen from observing FIGURE 1 and FIGURE 2 that the largest dimension of the inlet nozzle 15, measured in a plane perpendicular to the axis 17, is less than the shortest edge of outlets 43 and 51.

A reference letter $P_1$ indicates the pressure of the incoming fluid into inlet housing 13 and a reference letter $P_2$ indicates the outlet pressure associated with the pressure ratio sensor. The outlet pressure is defined as the pressure of the ambient fluid surrounding the pressure ratio sensor.

Figure 3:
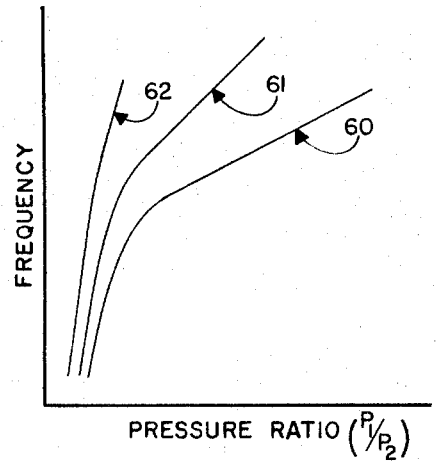
FIGURE 3 is a family of curves showing the frequency as a function of the ratio of the inlet pressure to the outlet pressure.

Referring now to FIGURE 3, plots of the frequency of oscillation of the pressure ratio sensor are shown as a function of the pressure ratio ($P_1/P_2$). These curves 60, 61, and 62 will be explained later in greater detail when the operation of the invention is explained.

Figure 4:
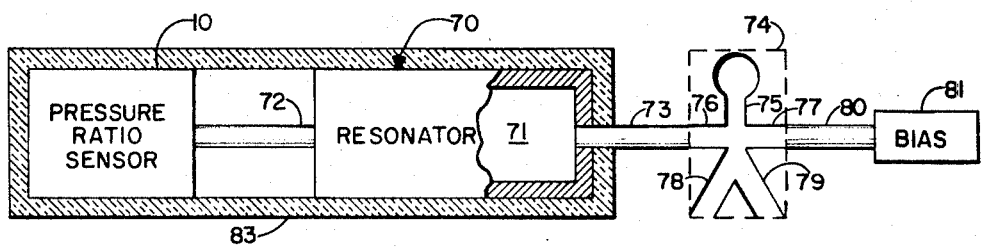
FIGURE 4 illustrates my temperature compensating circuit.

Referring now to FIGURE 4, the pressure ratio sensor is shown in block diagram form connected to a resonator 70. Resonator 70 consists of a hollowed-out chamber 71 having an inlet 72 and an outlet 73. Outlet 73 connects to a fluid amplifier 74 having a power nozzle 75, a first control port 76, a second control port 77, a first outlet port 78, and a second outlet port 79. A conduit 80 connects control port 77 to a biasing means 81. Located around pressure ratio sensor 10 and resonator 70 is an insulating material 83 which prevents rapid heat dissipation and thus maintains the pressure ratio sensor and resonator at the same temperature.

Figure 5:
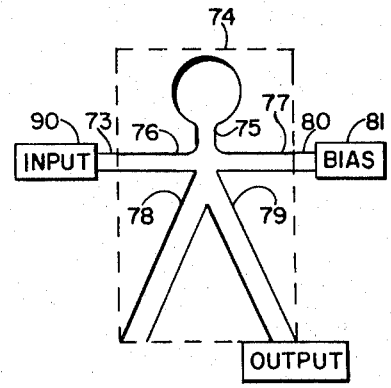
FIGURE 5 illustrates a fluid amplifier used in my temperature compensating circuit.

Referring now to FIGURE 5, fluid amplifier 74 shown in FIGURE 4 is reproduced, with block 90 indicating an input. FIGURE 5 has the same reference numerals for the various parts of the fluid amplifier as shown in FIGURE 4.

FIGURE 6 through FIGURE 9 are plots of pressure verses time with various signals into fluid amplifier 74.

These curves will be explained in greater detail when the operation of the invention is explained.

Figure 10:
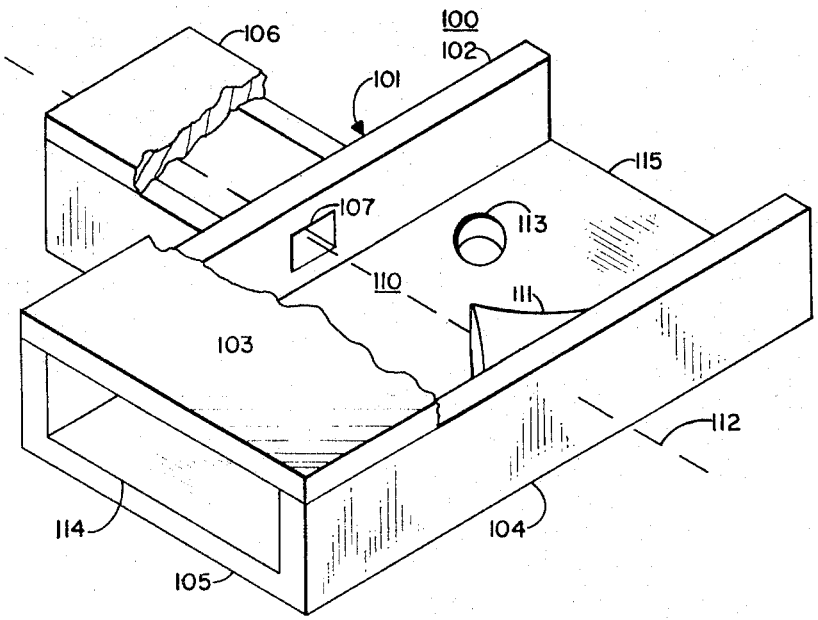
FIGURE 10 shows an alternate embodiment of my pressure ratio sensor.

Referring now to FIGURE 10, an alternate embodiment of my pressure ratio sensor is shown. Reference numeral 100 generally designates my pressure ratio sensor. A housing 101 is shown comprised by a first side 102, a top member 103, a second side 104, and a bottom member 105. First side 102, second side 104, and top and bottom members 103 and 105 respectively form a right parallelepipedous chamber within said housing 101.

Attached to housing 101 is a fluid inlet 106 having an inlet nozzle 107 therein. Inlet nozzle 107 abruptly diverges or expands into right parallelepipedous chamber 110. Located in chamber 110 and on side 104 is a splitter element 111 about which a fluid stream can oscillate. Splitter element 111 lies along an axis 112 passing through inlet nozzle 107 and inlet 106. Also located in chamber 110 is a signal pickoff 113 for obtaining a train of pressure pulses indicative of the oscillation of the fluid stream about splitter element 111.

A first outlet 114 for exhausting fluid from chamber 110 is located on one end of the right parallelepipedous chamber 110 and a second outlet 115 for exhausting fluid from chamber 110 is located on the opposite end of parallelepipedous chamber 110.

It will be seen from observing FIGURE 10 that the largest dimension of the inlet nozzle 107, measured in a plane perpendicular to axis 112, is less than the shortest dimension of outlets 114 and 115.

Referring now to FIGURES 1 and 2, the operation of my pressure ratio sensor will be explained. It will be noted that at the entrance to inlet housing 13 the pressure of the incoming fluid is indicated by a symbol $P_1$. The ambient pressure external to the pressure ratio sensor is designated by a symbol $P_2$ and for purpose of this specification will be called outlet pressure. The ratio of the inlet pressure $P_1$ to outlet pressure $P_2$ is the pressure ratio measured by my pressure ratio sensor 10.

When a fluid stream is introduced into inlet 13, it flows along fluid passage 14 through orifice 16 and into inlet nozzle 15. (The orifice 16 is removable and may be replaced by a larger or smaller orifice depending on the amount of flow desired into inlet nozzle 15.) The fluid stream flows from inlet nozzle 15 along and away from axis 17 and into chamber 20. A portion of the fluid stream continues flowing along axis 17 until it impinges on sharp splitter 18. Splitter 18 divides the fluid stream causing it to oscillate resulting in a pressure signal, that is, a train of pressure pulses are generated within chamber 20 by the fluid stream oscillating about splitter 18. The frequency of oscillation of the stream about splitter 18 is a function of the various geometrical parameters including the dimensions B, C, and D shown in FIGURE 1. For example, a typical set of dimensions are $B=\frac{1}{2}$ inch, $C=4$ inches, and $D=1$ inch.

The pressure pulse generated by the oscillating fluid stream propogate outward through chamber 20 into outlets 51 and 43. Located in chamber 20 is the pickoff 31 for transmitting these pressure pulses generated within chamber 20 to an appropriate receiver. The number of pressure pulses passing through pickoff 31 per second is indicative of the frequency oscillation of the fluid stream emanating from inlet 15. It will be noted that chamber 20 diverges outward from axis 17. I have discovered that the diverging passageway or expanding area on each side of the axis 17 causes my pressure ratio sensor to be insensitive to variations in the absolute value of the ambient outlet pressure $P_2$ while still sensitive to the ratio of the inlet pressure $P_1$ to the outlet pressure $P_2$.

Referring to FIGURE 3, a family of curves 60, 61, and 62 are shown. The frequency of oscillation is plotted along the ordinate axis and the pressure ratio $P_1/P_2$ is plotted along the abscissa. Three curves are shown to illustrate what different geometrical variations of dimensions B, C, and D of FIGURE 1 can do to the output signal of the pressure ratio sensor. For example, if a high gain is desired and a linear curve is also desired, the dimension D can be made small as well as the dimension C resulting in a curve similar to curve 62. Likewise, by opening up the dimension B and lengthening C the curve can be dropped down to curve 61. Similarly, curve 60 can be obtained by further expanding the dimension B and the dimension C. Also by increasing the length D the frequency of oscillation of my pressure ratio sensor can be decreased for a given ratio of pressures $P_1/P_2$ across my device. It will be noted that this family of curves 60, 61, and 62 are caused by variations in the geometry of the pressure ratio sensor and not by variations of the reference pressure $P_2$.

A family of similar curves can also be generated in prior art pressure ratio sensor by variations in the outlet pressure $P_2$. This effect as mentioned previously in the discussion of the prior art is undesirable, since one does not have any meaningful output signal. I have discovered that to eliminate this effect, due to variation in ambient outlet pressure $P_2$, as mentioned previously, I must have a particular expanded area or divergent section in my chamber 20 that eliminates changes in the output signal due to variations of outlet pressure $P_2$. For example, with an expanded area or divergent section curve 60 has the same shape and position for an outlet reference pressure $P_2$ of 1 p.s.i.a. or 15 p.s.i.a.

Referring now to FIGURE 4, my temperature compensating circuit is shown. Since the fluid screen oscillation within my pressure ratio sensor is somewhat dependent upon temperature, it is necessary to eliminate the temperature effects on the system. In order to eliminate temperature effects, I have enclosed my pressure ratio sensor 10 and resonant chamber 70 within an insulated housing 83. Insulated housing 83 ensures that the temperature of the fluid within pressure ratio sensor 10 and resonator 70 will be the same. Resonator 70 comprises a hollowed-out chamber 71 that offers a low impedance path when a fluid pressure pulse achieves a resonance condition of increased amplitude because of reinforcement of the reflected pressure wave. The resonant frequency of the chamber 70 is a function of the length of the chamber and the temperature of the fluid therein. If the temperature of the fluid within the pressure ratio sensor is increased, causing the pressure ratio sensor to oscillate at a higher frequency, the temperature of the fluid within resonant chamber 70 also increases. The increasing of the temperature of the fluid in resonant chamber 70 causes an increase in a resonance frequency of the fluid within the chamber 70. That is, the sonic pressure pulses travel at a faster speed at a higher temperature and consequently take less time to reach a state of increased energy or resonance. Since the temperature sensor and the resonant chamber have the same fluid, at the same temperature therein, and are responsive to changes in temperature both will have a corresponding increase in their respective frequency reference. That is, the pressure ratio sensor will increase its output frequency with a temperature increase, at a constant pressure ratio, while the resonance frequency of the fluid within resonant chamber 70 will correspondingly increase since both of them are roughly proportional to the square root of the temperature. Because the output signal from the resonant chamber increases as a condition of resonance is approached it is apparent that the temperature change merely shifts the reference point of operation of the system but does not affect the amplitude of the output signal from resonant chamber 70. For example, if the pressure ratio sensor is oscillating at 500 c.p.s. and the resonant chamber has a resonant frequency of 500 c.p.s., a maximum output signal would be generated at the output 73. Now if the temperature of the fluid is increased the sonic velocity of the fluid increases affecting the pressure ratio sensor the same as the resonant chamber.

That is, the pressure ratio sensor may now be oscillating at 550 c.p.s., but the resonant chamber has a resonant frequency of 550 c.p.s. so that a maximum output signal is generated even though the change in temperature has affected both the pressure ratio sensor and the resonant chamber.

A conduit 73 for transmitting fluid signals connects resonant chamber 70 to fluid amplifier 74. In the absence of an input signal in conduit 73, a fluid stream flows out of outlet leg 78 because of a strong positive fluid biasing signal from biasing means 81. Fluid biasing means 81 is continually supplying fluid and directs the fluid stream away from outlet leg 79 and into outlet leg 78. When a positive pressure pulse is generated within chamber 71, it is transmitted to control port 76 of fluid amplifier 74. This positive pressure pulse at control port 76 opposes the biasing signal in control port 77 and momentarily diverts a portion of the fluid into outlet leg 78. The operation of fluid amplifier 74 will be more apparent when viewed in conjunction with FIGURES 6 through 9.

Figure 6:
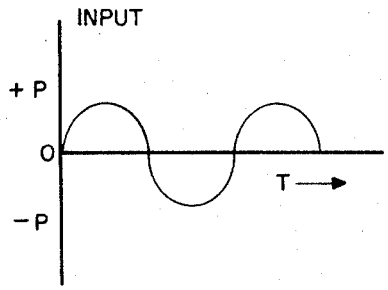
FIGURE 6 is an illustration of the input signal, at a specific state, to my fluid amplifier.

Referring now to FIGURE 5, it will be noted that fluid amplifier 74 is reproduced therein and an input 90 is shown in place of the pressure ratio sensor and resonant chamber. Referring to FIGURE 6, a typical input signal into control port 76 of fluid amplifier 74 is shown. It will be noted that this curve is sinusoidal in nature and goes through a plus and minus pressure region (P+ P−). When the curve is in a plus pressure region (P+ above atmospheric pressure or some other reference) a signal is generated in control port 76 that opposes a fluid biasing signal in control port 77. This results in a momentary interruption of a portion of the fluid flowing into outlet leg 78 and consequently diverts a portion of the fluid into outlet leg 79.

Figure 7:
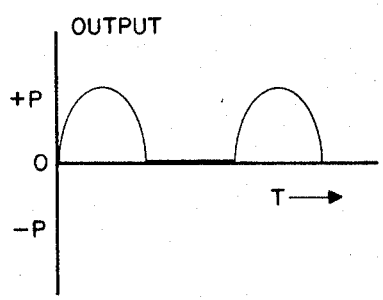
FIGURE 7 is an illustration of the output of my fluid amplifier at a state corresponding to the input of FIGURE 6.
Figure 9:
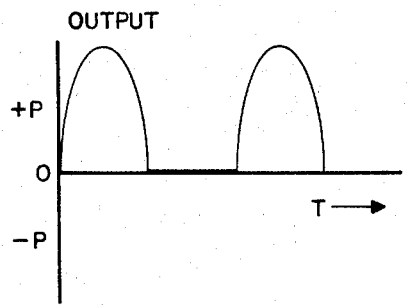
FIGURE 9 is an illustration of the output of my fluid amplifier corresponding to the same input state as shown in FIGURE 8.

By referring to FIGURE 7, one will note that an output signal P+ is generated during the duration of the input pulse in the positive pressure area P+. Once the positive pressure pulse is removed from the input and the input signal becomes negative no fluid flows into outlet leg 79. The biasing signal is now predominant and causes the fluid to flow into outlet leg. This results in a zero flow condition or a zero pressure condition in outlet leg 79, as indicated by FIGURE 7. Once a pressure signal in the input 76 becomes positive again, a signal is generated within control port 76 tending to oppose the fluid bias signal. This results in a second pressure pulse in the output as shown in FIGURE 7. Thus, the bias of the fluid amplifier as shown chops off the negative portion of the input signal.

Figure 8:
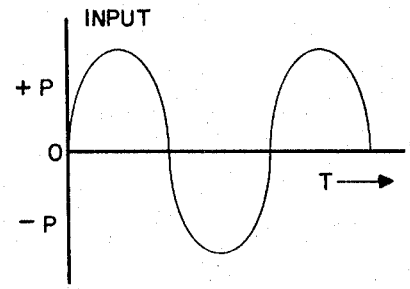
FIGURE 8 is likewise an illustration of an input signal at a particular state.

Referring to FIGURE 8, a similar curve to the input is shown with a larger amplitude due to conditions such as resonance in the resonant chamber 71. The same event occurs in this situation; namely, the positive pressure pulses or those tending to oppose the fluid biasing signal from control port 77, generate a positive fluid output signal in outlet leg 79. Once again, it will be noted in FIGURE 9 that the negative port of the input signal is chopped off.

From FIGURE 6 through FIGURE 9, it is apparent that the device as shown chops off the negative portion of the outlet or output signal resulting in a series of positive pressure pulses. When a resonant condition occurs, the amplitude of the output pressure pulses increases since the amplitude of the input pulses increases. By integration of the area under the curves in FIGURE 7 and FIGURE 9, an output signal indicative of the strength of the input signal will be obtained. For purposes of obtaining an integrated signal proportional to the pressure ratio ($P_1/P_2$) across my pressure ratio sensor, I use a short piece of tubing connected to the output of fluid amplifier 74. This tubing produces the desired integration like a fluid capacitance integrator.

Referring now to FIGURE 10, an alternate embodiment of my pressure ratio sensor is shown. It will be noted that the sensor is similar in structure to FIGURE 1, but an expanded area formed inside 101 around inlet nozzle 107 is present in the embodiment shown in FIGURE 10 as opposed to the gradual divergence shown in FIGURE 1 and FIGURE 2. I have discovered that the particular shapes shown in the drawing cause my pressure ratio sensor to operate satisfactorily.

Fluid pressure ratio sensor 100 operates in a similar manner to pressure ratio sensor 10. A fluid flows in through inlet 107 and expands away from axis 112 as it enters right parallelepipedous chamber 110. However, momentum of the fluid stream causes a portion of it to impinge and oscillate about splitter 111. A pickoff 113 is located in the bottom side 114 for obtaining an output signal indicative of the oscillation of the fluid stream issuing from inlet nozzle 107.

I claim:

1. In combination:
    means for receiving an inlet fluid at a pressure and exhausting the fluid into an ambient outlet fluid at a different pressure, said means operable to produce a train of fluid pulses having a frequency which varies with the ratio of the inlet fluid pressure to the ambient outlet fluid pressure;
    fluid resonant means connected to said first-named means;
    means connected to said resonant means for giving a fluid output determined by said train transmitted through said resonance means; and
    an insulating matreial surrounding the first-named means and the resonant means to thereby compensate for variations in fluid temperature.

2. A pressure ratio sensor comprising:
    housing means defining a chamber having an inlet aligned with an axis and a pair of outlets spaced apart from the axis on opposite sides thereof and symmetrically positioned with respect thereto, the smallest dimension of each outlet being greater than the largest dimension of the inlet measured perpendicular to the axis, said housing means including a wall positioned opposite the inlet and substantially perpendicular to the axis;
    a splitter positioned within the chamber opposite the inlet and substantially aligned with said axis; and
    pickoff means located in said housing.

3. The apparatus of claim 2, including fluid resonant means connected to said pickoff means and fluid output means connected to said resonant means.

4. The apparatus of claim 3, including an insulating material surrounding said housing means to thereby compensate for variations in fluid temperature.

5. In a pressure ratio sensor having an oscillating output signal:
    a housing defining a chamber having an inlet aligned with an axis and a pair of outlets spaced apart from the axis on opposite sides thereof, the chamber forming an expanded area around the nozzle in all directions transverse to the axis;
    a splitter element positioned within the chamber in substantial alignment with the axis and spaced apart from the nozzle; and
    pickoff means located in said housing.

6. The apparatus of claim 5 further including resonant means connected to said pickoff means.

7. The apparatus of claim 5 further including insulating material surrounding said housing.

(References on following page)

References Cited

UNITED STATES PATENTS

| | | | |
|---|---|---|---|
| 3,011,382 | 12/1961 | Kim | 84—410 XR |
| 3,111,931 | 11/1963 | Bodine | 137—815 XR |
| 3,171,422 | 3/1965 | Evans | 137—815 |
| 3,228,410 | 1/1966 | Warren et al. | 137—815 |
| 3,233,522 | 2/1966 | Stern | 137—815 XR |
| 3,247,860 | 4/1966 | Zilberfarb | 137—815 |
| 3,275,015 | 9/1966 | Meier | 137—815 |
| 3,311,122 | 3/1967 | Gottron | 137—815 |
| 3,340,884 | 9/1967 | Warren et al. | 137—815 |

SAMUEL SCOTT, *Primary Examiner.*